United States Patent
Zhu et al.

(10) Patent No.: US 10,219,309 B2
(45) Date of Patent: Feb. 26, 2019

(54) D2D SERVICE AUTHORIZING METHOD AND DEVICE AND HOME NEAR FIELD COMMUNICATION SERVER

(71) Applicant: ZTE CORPORATION, Shenzhen, Guangdong Province (CN)

(72) Inventors: Jinguo Zhu, Shenzhen (CN); Fei Lu, Shenzhen (CN)

(73) Assignee: XI'AN ZHONGXING NEW SOFTWARE CO., LTD., Xi'An, Shaanxi (CN)

(*) Notice: Subject to any disclaimer, the term of this patent is extended or adjusted under 35 U.S.C. 154(b) by 154 days.

(21) Appl. No.: 15/322,734

(22) PCT Filed: Dec. 1, 2014

(86) PCT No.: PCT/CN2014/092716
§ 371 (c)(1),
(2) Date: Mar. 22, 2017

(87) PCT Pub. No.: WO2016/000395
PCT Pub. Date: Jan. 7, 2016

(65) Prior Publication Data
US 2017/0196033 A1    Jul. 6, 2017

(30) Foreign Application Priority Data
Jun. 30, 2014   (CN) .......................... 2014 1 0307071

(51) Int. Cl.
*H04W 4/80* (2018.01)
*H04W 8/00* (2009.01)
(Continued)

(52) U.S. Cl.
CPC ............ *H04W 76/14* (2018.02); *H04W 4/80* (2018.02); *H04W 8/00* (2013.01); *H04W 8/18* (2013.01);
(Continued)

(58) Field of Classification Search
CPC ....... H04W 76/14; H04W 4/80; H04W 76/10; H04W 8/00; H04W 8/18; H04W 8/205; H04W 12/08
(Continued)

(56) References Cited

U.S. PATENT DOCUMENTS

| 2007/0060097 A1* | 3/2007 | Edge ................. H04L 29/06027 |
| | | 455/404.1 |
| 2013/0237148 A1* | 9/2013 | McCann ................. H04W 4/02 |
| | | 455/41.1 |

(Continued)

FOREIGN PATENT DOCUMENTS

| CN | 102932828 A | 2/2013 |
| CN | 103379501 A | 10/2013 |
| CN | 103428760 A | 12/2013 |

OTHER PUBLICATIONS

3GPP Draft, 3rd Generation Partnership Project; Technical Specification Group Services and System Aspects; Proximity-based services (ProSe); Stage 2 (Release 12), 3GPP TS 23.303 (Jun. 2014), XP050835156.

(Continued)

*Primary Examiner* — Christopher R Crompton
(74) *Attorney, Agent, or Firm* — Ling Wu; Stephen Yang; Ling and Yang Intellectual Property (57) ABSTRACT

The present document provides a Device to Device (D2D) service authorization method and apparatus and a home near field communication server. The above method includes: a home near field communication server obtaining a local PLMN list of a location in which a user equipment is currently located and a first PLMN list that a permission of authorization to the user equipment is a condition authorization; performing intersection processing on the local PLMN list and the first PLMN list to obtain a second PLMN list; generating an authorized PLMN list according to (Continued)

PLMNs permitting a D2D authorization to the user equipment in the second PLMN list; and the home near field communication server sending the authorized PLMN list to the user equipment.

6 Claims, 6 Drawing Sheets

(51) Int. Cl.
    *H04W 8/18*     (2009.01)
    *H04W 8/20*     (2009.01)
    *H04W 12/08*     (2009.01)
    *H04W 76/10*     (2018.01)
    *H04W 76/14*     (2018.01)

(52) U.S. Cl.
    CPC .......... *H04W 8/205* (2013.01); *H04W 12/08* (2013.01); *H04W 76/10* (2018.02)

(58) Field of Classification Search
    USPC ......................................... 370/328
    See application file for complete search history.

(56) References Cited

U.S. PATENT DOCUMENTS

| 2013/0337778 | A1* | 12/2013 | Ye | H04W 36/0061 |
| | | | | 455/411 |
| 2014/0171078 | A1* | 6/2014 | Ryerson | H04W 48/18 |
| | | | | 455/435.2 |
| 2015/0237487 | A1* | 8/2015 | Titcombe | H04W 4/14 |
| | | | | 455/466 |
| 2015/0281942 | A1* | 10/2015 | Lee | H04W 48/16 |
| | | | | 455/434 |
| 2016/0044567 | A1* | 2/2016 | Baghel | H04W 28/08 |
| | | | | 370/331 |

OTHER PUBLICATIONS

3GPP Draft, "Prose Authorization", SA WG2 Meeting #104, Dublin, Ireland; Jul. 7-11, 2014, S2-142540, XP050836971.

\* cited by examiner

D2D SERVICE AUTHORIZING METHOD AND DEVICE AND HOME NEAR FIELD COMMUNICATION SERVER

TECHNICAL FIELD

The present document relates to the field of communications, and more particularly to a Device to Device (D2D) service authorization method and apparatus and a home near field communication server.

BACKGROUND

If terminals in adjacent areas use D2D to directly communicate, many benefits, such as a higher rate, a lower delay and a lower power consumption, can be brought to the terminals, at the same time, the wireless resource efficiency of operators are improved greatly, and the Relay mode of D2D is beneficial for the operators to improve the wireless coverage; for applications, using neighborhood information of a D2D communication process can develop more attractive new services. A Public Safety (PS) system can also use the D2D technology to achieve communication between the terminals when there is no wireless coverage.

Figure 1:
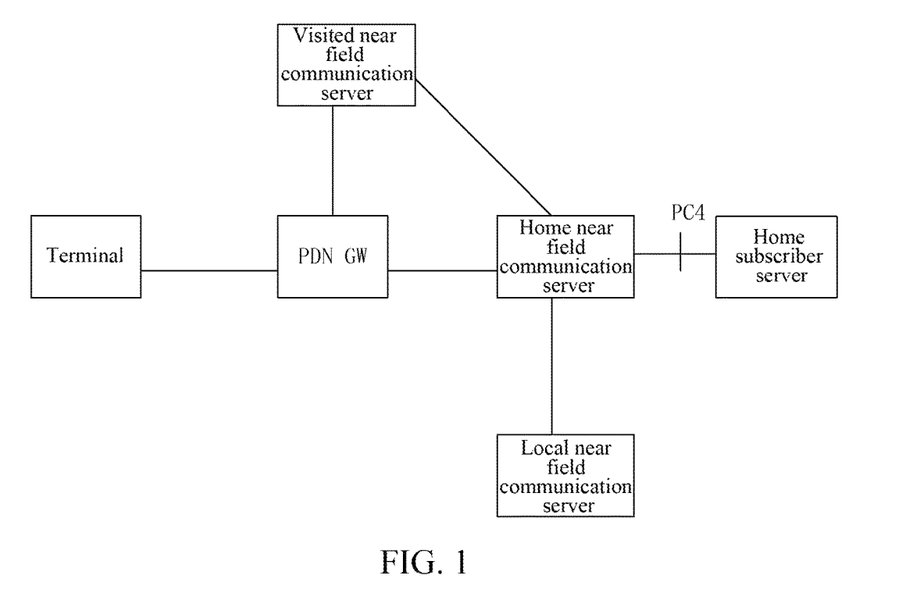
FIG. 1 is a schematic diagram of a D2D architecture according to the related art.

FIG. 1 is a schematic diagram of a 3GPP-related D2D architecture according to the related art; as shown in FIG. 1, functions of key network elements are described below.

A terminal, which is also called User Equipment (UE), is supported that the terminals directly find each other via an air interface and directly communicate without a network.

A core network gateway, which is also called a Packet Data Network Gateway (PDN GW), is used for providing an access point for the terminal to access a PDN network, and mainly functions include assigning an IP address for the terminal, forwarding a data packet sent by the terminal to a corresponding PDN network via IP, mapping the data packets issued by the PDN network to different bearers according to different flows, and then sending the data packets to the terminal.

A home subscriber server is in a home network, and mainly functions are providing subscription information and authentication information of users and applications.

A near field communication server is outside the PDN GW, and mainly functions include D2D service authorization, and assigning a temporary code for the application requested by the terminal so as to used for terminal broadcasting, assist with D2D discovery and charge, etc. At present, only one near field communication server is deployed in one Public Land Mobile Network (PLMN).

There are three types of near field communication servers according to whether a user is in a roaming state. The first is a home near field communication server, which is in a home PLMN of a subscriber, and mainly functions are obtaining subscription information of user from the home subscriber server, and performing the D2D service authorization according to the subscription information. The second is a visited near field communication server, which is in a PLMN of a roaming location when the user is roaming, and mainly functions are checking whether the user in the roaming state is allowed to perform D2D services in the network according to a local policy, including sending a D2D signal and monitoring the D2D signal. The third is a local near field communication server, which is in another network, except for a visited network, at the location in which the user is located and covered with signals, and the network is also called a local network. There may be multiple local networks at the current location of the user, and mainly functions are checking whether the user is allowed to monitor the D2D service in the network according to a local policy.

Figure 2:
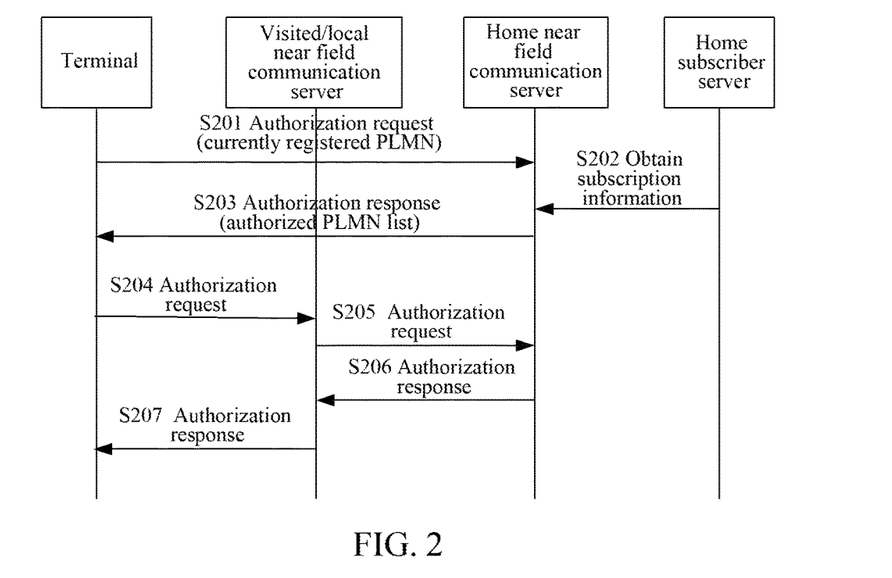
FIG. 2 is a flowchart of a D2D service authorization method according to the related art.

FIG. 2 is a schematic diagram of a D2D service authorization process. The flow includes the following steps.

In step S201: after establishing a connection with the PDN GW and obtaining a user IP address from the PDN GW, a terminal sends an authorization request to a home near field communication server. The terminal inquires a corresponding IP address through a Domain Name Server (DNS) according to a Fully Qualified Domain Name (FQDN) of the home near field communication server, and then communicates with the address. The FQDN of the home near field communication server can be either statically configured in the terminal or deduced according to a home PLMN ID. The IP address of the home near field communication server can also be configured in the terminal. The authorization message contains information about the PLMN which the user is currently in and a user identity, for example the International Mobile Subscriber Identity (IMSI) or the Mobile Subscriber International ISDN/PSTN Number (MSISDN), herein the ISDN is short for Integrated Service Digital Network, and the PTSN is short for Public Switched Telephone Network.

In step S202: if there is no subscription information of user in the home near field communication server, the home near field communication server requests the home subscriber server for the subscription information of user, and the request carries the user identity; the home near field communication server stores the subscription information in the local database after obtaining it.

In step S203: the home near field communication server returns D2D authorization information of the user according to the subscription information of user and local configuration, the authorization information includes: a PLMN list permitting full authorization of the D2D service, a PLMN list permitting condition authorization of the D2D service, and a local PLMN list of the current location of the user.

In step S204: for the PLMN list permitting full authorization of the D2D service, the UE can directly initiate the D2D service in the PLMN; for the LMN list permitting condition authorization of the D2D service, the user needs to authorize in the PLMN again; the user selects the PLMNs that are overlapped in the PLMN list permitting condition authorization of the D2D service and the local PLMN list provided by the home near field communication server, and then initiates authorization to the PLMN. The PLMN may be either a local network or a visited network. The terminal deduces FQDN information of the near field communication server from information about the selected PLMN, inquires the DNS to obtain the IP address of the near field communication server of the PLMN, and then initiates an authorization request to the address, the request carries the user identity.

In step S205: the local/visited near field communication server obtains FQDN information of the home subscriber near field communication server according to the IMSI of the user, inquires the DNS to obtain the IP address of the home near field communication server, and then initiates an authorization request to the address, the request carries the user identity.

In step S206: the home near field communication server returns an authorization response.

In step S207: the local/visited near field communication server returns the authorization result back to the terminal according to the local configuration to indicate whether the terminal is allowed to conduct the D2D service in the network.

If the terminal needs to authorize multiple local/visited near field communication servers in step 204, the steps from step S204 to step S207 are repeated.

After that, the terminal decides whether to initiate the D2D service according to the authorization result.

There are two problems in the above process; the first problem is that in step S203, the home near field communication server needs to configure all the local PLMN lists at the location of the user, when the lists change, all the near field communication servers in the network need to update, so it is very difficult to operate; the second problem is that in step S204, the terminal may be unable to communicate with the local/visited near field communication server, unless the current PDN GW and the local/visited near field communication server are in the same network, or the local/visited near field communication server has an externally reachable IP address, but in many cases, the above conditions cannot be satisfied, so the D2D service authorization will not be realized.

SUMMARY

Aiming at the technical problems in the related art that, it is difficult to operate because a home near field communication server needs to be configured with a local PLMN list, and a service authorization cannot be realized because a terminal may be unable to communicate with a local or visited near field communication server, the embodiments of the present document provides a D2D service authorization method, apparatus and system and a home near field communication server, to at least solve the above technical problems.

According to an embodiment of the present document, a D2D service authorization method is provided, which includes: obtaining, by a home near field communication server, a local PLMN list of a location in which a user equipment is currently located and a first PLMN list that a permission of authorization to the user equipment is a condition authorization; performing, by the home near field communication server, intersection processing on the local PLMN list and the first PLMN list to obtain a second PLMN list; generating, by the home near field communication server, an authorized PLMN list according to PLMNs permitting a D2D authorization to the user equipment in the second PLMN list; and sending, by the home near field communication server, the authorized PLMN list to the user equipment.

Alternatively, obtaining, by the home near field communication server, the local PLMN list of the location in which the user equipment is currently located includes one of the followings: obtaining, by the home near field communication server, the local PLMN list by static configuration; requesting, by the home near field communication server, a visited near field communication server of a visited network in which the user equipment is currently located for the local PLMN list.

Alternatively, the home near field communication server obtains the first PLMN list in the following way: obtaining, by the home near field communication server, the first PLMN list according to subscription information of the user equipment.

Alternatively, before generating, by the home near field communication server, the authorized PLMN list according to the PLMNs permitting the D2D authorization to the user equipment in the second PLMN list, the method includes: determining, by the home near field communication server, a specified near field communication server deployed in each PLMN in the second PLMN list; sending, by the home near field communication server, an authorization request to the specified near field communication server; and receiving, by the home near field communication server, a response message of the authorization request, herein the response message carries authorization information of the PLMN to the user equipment, and the authorization information is used for indicating whether authorization to the user equipment is permitted.

Alternatively, the specified near field communication server includes one of the followings: a local near field wireless communication server and a visited near field wireless communication server.

Alternatively, when the home near field communication server obtains the first PLMN list, the method further includes: obtaining, by the home near field communication server, a third PLMN list that the permission of authorization to the user equipment is a full authorization.

Alternatively, generating, by the home near field communication server, the authorized PLMN list according to the PLMNs permitting the D2D authorization to the user equipment in the second PLMN list includes: performing, by the home near field communication server, intersection processing on the local PLMN list and the third PLMN list to obtain a fourth PLMN list; and combining, by the home near field communication server, the fourth PLMN list and the PLMNs permitting the D2D authorization to the user equipment in the second PLMN list to obtain the authorized PLMN list.

Alternatively, sending, by the home near field communication server, the authorized PLMN list to the user equipment includes one of the followings: when the user equipment accesses a Packet Data Network Gateway (PDN GW) located in a visited network, sending, by the home near field communication server, the authorized PLMN list to the user equipment via the visited near field communication server; when the user equipment accesses a PDN GW located in a home network, sending, by the home near field communication server, the authorized PLMN list directly to the user equipment.

According to another embodiment of the present document, a D2D service authorization method is provided, which includes: obtaining, by a home near field communication server, a first Public Land Mobile Network (PLMN) list that a permission of authorization to a user equipment is a condition authorization; generating, by the home near field communication server, a second PLMN list according to PLMNs permitting a D2D authorization to the user equipment in the first PLMN list; sending, by the home near field communication server, the second PLMN list to a visited near field communication server; receiving, by the visited near field communication server, the second PLMN list, and performing intersection processing on a local PLMN list obtained by the visited near field communication server and the second PLMN list to obtain a third PLMN list; and sending, by the visited near field communication server, the third PLMN list to the user equipment.

Alternatively, before generating, by the home near field communication server, the second PLMN list according to the PLMNs permitting the D2D authorization to the user equipment in the first PLMN list, including: determining, by the home near field communication server, a specified near field communication server deployed in each PLMN in the first PLMN list; sending, by the home near field communication server, an authorization request to the specified near field communication server; and receiving, by the home near field communication server, a response message of the authorization request, herein the response message carries authorization information of the PLMN to the user equipment, and the authorization information is used for indicating whether authorization to the user equipment is permitted.

Alternatively, the local PLMN list is obtained in the following way: obtaining, by the visited near field communication server, the local PLMN list by local static configuration.

Alternatively, when obtaining, by the home near field communication server, the first PLMN list that a permission of authorization to a user equipment is a condition authorization, the method further includes: obtaining, by the home near field communication server, a fourth PLMN list that the permission of authorization to the user equipment is a full authorization.

Alternatively, generating, by the home near field communication server, the authorized PLMN list according to the PLMNs permitting the D2D authorization to the user equipment in the second PLMN list includes: performing, by the home near field communication server, combination processing on the fourth PLMN list and the second PLMN list to obtain a fifth PLMN list; and performing, by the home near field communication server, intersection processing on the fifth PLMN list and the local PLMN list to obtain the third PLMN list.

Alternatively, before generating, by the home near field communication server, the second PLMN list according to the PLMNs permitting the D2D authorization to the user equipment in the first PLMN list, including: determining, by the home near field communication server, a specified near field communication server deployed in each PLMN in the first PLMN list; sending, by the home near field communication server, an authorization request to the specified near field communication server; and receiving, by the home near field communication server, a response message of the authorization request, herein the response message carries authorization information of the PLMN to the user equipment, and the authorization information is used for indicating whether authorization to the user equipment is permitted.

According to another embodiment of the present document, a D2D service authorization apparatus is provided, which is applied to a home near field communication server, and includes: an obtaining module, arranged to obtain a local Public Land Mobile Network (PLMN) list of a location in which a user equipment is currently located and a first PLMN list that a permission of authorization to the user equipment is a condition authorization; a processing module, arranged to perform intersection processing on the local PLMN list and the first PLMN list to obtain a second PLMN list; a generating module, arranged to generate an authorized PLMN list according to PLMNs permitting a D2D authorization to the user equipment in the second PLMN list; and a sending module, arranged to send the authorized PLMN list to the user equipment.

According to another embodiment of the present document, a home near field communication server is provided, which includes the above D2D service authorization apparatus.

According to another embodiment of the present document, a D2D service authorization system is provided, which includes: a home near field communication server, arranged to obtain a first Public Land Mobile Network (PLMN) list that a permission of authorization to a user equipment is a condition authorization, generate a second PLMN list according to PLMNs permitting a D2D authorization to the user equipment in the first PLMN list, and send the second PLMN list to a visited near field communication server; the visited near field communication server, arranged to receive the second PLMN list, perform intersection processing on a local PLMN list obtained by the visited near field communication server and the second PLMN list to obtain a third PLMN list, and send the third PLMN list to the user equipment.

According to another embodiment of the present document, a D2D service authorization method is provided, which includes: determining, by a home near field communication server, a Public Land Mobile Network (PLMN) list needed to be further authorized; determining, by the home near field communication server, a specified near field communication server address deployed in each PLMN in the PLMN list needed to be further authorized; sending, by the home near field communication server, an authorization request to a specified near field communication server indicated by the specified near field communication server address; receiving, by the home near field communication server, a response message of the authorization request, and generating an authorized PLMN list according to the response message, herein the response message carries D2D service authorization information of the PLMN to a user equipment, and the D2D service authorization information is used for indicating whether the PLMN permits D2D service authorization to the user equipment; and sending, by the home near field communication server, the generated and authorized PLMN list to the user equipment.

Alternatively, determining, by the home near field communication server, the PLMN list needed to be further authorized includes: performing, by the home near field communication server, intersection processing on a local PLMN list and a PLMN list of the D2D authorization in user subscription information to obtain the PLMN list needed to be further authorized.

Alternatively, the local PLMN list is obtained in one of the following ways: obtaining, by the home near field communication server, the local PLMN list by static configuration; and requesting, by the home near field communication server, a visited near field communication server of a visited network in which the user equipment is currently located for the local PLMN list.

Alternatively, the specified near field communication server includes one of the followings: the local near field wireless communication server and the visited near field wireless communication server.

According to another embodiment of the present document, a D2D service authorization apparatus is provided, which is applied to a home near field communication server, including: a processing module, arranged to determine a Public Land Mobile Network (PLMN) list needed to be further authorized, and determine a specified near field communication server address deployed in each PLMN in the PLMN list needed to be further authorized; a first sending module, arranged to send an authorization request to a specified near field communication server indicated by the specified near field communication server address; a receiving module, arranged to receive a response message of the authorization request, and generate an authorized PLMN list according to the response message, herein the response message carries D2D service authorization information of the PLMN to a user equipment, and the D2D service authorization information is used for indicating whether the PLMN permits D2D service authorization to the user equipment; and a second sending module, arranged to send the generated and authorized PLMN list to the user equipment.

Alternatively, the apparatus further includes: an obtaining module, arranged to obtain a local PLMN list of a location in which the user equipment is currently located and the authorized PLMN list in user equipment subscription information; and the processing module, arranged to perform intersection processing on the local PLMN list and a PLMN list of the D2D service authorization in the user subscription information to obtain the PLMN list needed to be further authorized.

According to another embodiment of the present document, a home near field communication server is provided, which includes the above Device to Device (D2D) service authorization apparatus.

According to the present document, adopting the technical means, that the home near field communication server generates the authorized PLMN list according to the obtained first PLMN list of the condition authorization and the local PLMN list, solves the technical problems in the related art that it is difficult to operate because the home near field communication server needs to be configured with the local PLMN list and a service authorization cannot be realized because a terminal may be unable to communicate with the local or visited near field communication server, so the local PLMN network list can be obtained without configuring the home near field communication server, and the authorized PLMN list can be obtained without communication between the UE and the local or visited near field communication server.

BRIEF DESCRIPTION OF DRAWINGS

The accompanying drawings described here are used for providing a further understanding of the present document, and constitute a part of the present application. Schematic embodiments of the present documentand description thereof are used for illustrating the present document and not intended to form an improper limit to the present document. In the accompanying drawings.

DETAILED DESCRIPTION

The present document is illustrated in detail below with reference to the accompanying drawings and in combination with embodiments. It is noted that, the embodiments in the present application and the features in the embodiments can be combined with each other on the condition of no conflict.

Aiming at the technical problems in the related art that, (1) it is difficult to operate because a home near field communication server needs to be configured with a local PLMN list and (2) service authorization cannot be realized because a terminal may be unable to communicate with a local or visited near field communication server, the following embodiments provide corresponding solutions, which are elaborated below.

First, an illustration is given from a home near field communication server side.

Figure 3:
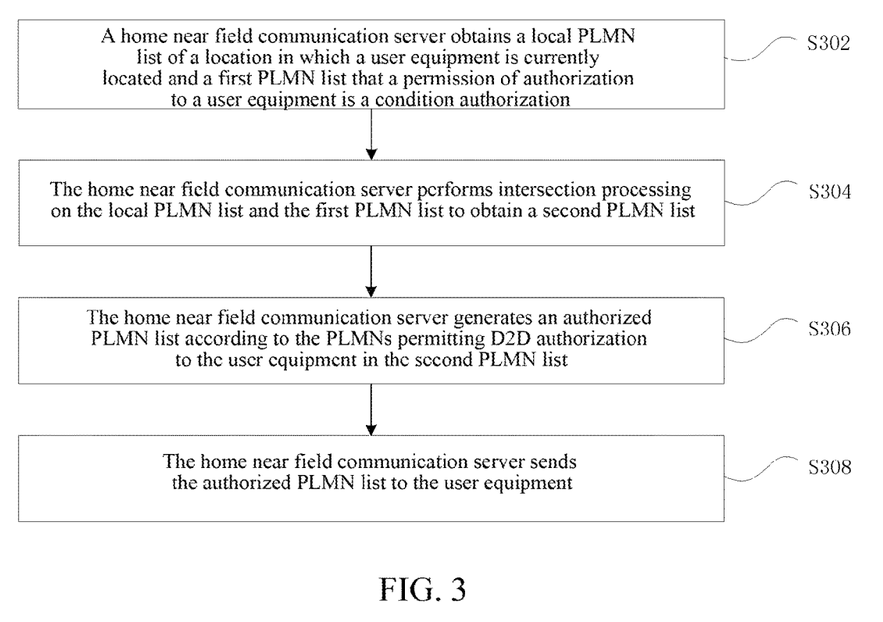
FIG. 3 is a flowchart of a D2D service authorization method according to an embodiment of the present document.

FIG. 3 is a flowchart of a D2D service authorization method according to an embodiment of the present document. As shown in FIG. 3, the method includes the following processing steps:

In step S302: a home near field communication server obtains a local PLMN list of a location in which a UE is currently located and a first PLMN list that a permission of authorization to the UE is a condition authorization;

In step S304: the home near field communication server performs intersection processing on the local PLMN list and the first PLMN list to obtain a second PLMN list;

In step S306: the home near field communication server generates an authorized PLMN list according to PLMNs permitting a D2D authorization to the UE in the second PLMN list; and In step S308: the home near field communication server sends the authorized PLMN list to the UE.

Through the above processing steps, the home near field communication server can obtain the authorized PLMN list without being configured, and the UE has no need to communicate with a local or visited near field communication server, so the above technical problems can be solved.

In the embodiment, there are various ways of obtaining the local PLMN list; for example, the local PLMN list can be obtained in, but not limited to, one of the following ways:

(1) The home near field communication server obtains the local PLMN list by static configuration; and (2) The home near field communication server requests a visited near field communication server of a visited network in which the UE is currently located for the local PLMN list.

In an alternative embodiment, the home near field communication server can obtain the first PLMN list according to subscription information of the UE. For example, the home near field communication server can obtain the first PLMN list according to the locally stored subscription information or the subscription information obtained from a home subscriber server.

In the embodiment, the home near field communication server can generate the authorized PLMN list in, but not limited to, the following way:

the home near field communication server determines a specified near field communication server deployed in each PLMN in the second PLMN list;

the home near field communication server sends an authorization request to the specified near field communication server; and the home near field communication server receives a response message of the authorization request, herein the response message carries authorization information of the PLMN to the UE, and the authorization information is used for indicating whether authorization to the UE (namely D2D service authorization) is permitted. In such a manner, the home near field communication server can determine the authorized PLMN list according to the above authorization information.

It is illustrated that, the specified near field communication server includes, but is not limited to, a local near field wireless communication server and a visited near field wireless communication server.

In an alternative embodiment, when obtaining the first PLMN list, the home near field communication server can also obtain a third PLMN list that the permission of authorization to the UE is a full authorization to the UE, at the time, the home near field communication server can perform intersection processing on the local PLMN list and the third PLMN list to obtain a fourth PLMN list.

Then, the home near field communication server combines the fourth PLMN list and the PLMNs permitting the D2D authorization to the UE in the second PLMN list to obtain the authorized PLMN list.

There are various ways of implementing step S308, for example, one of the following ways: (1) when the UE accesses a PDN GW in the visited network, the home near field communication server sends the authorized PLMN list to the UE via the visited near field communication server; (2) when the UE accesses the PDN GW in a home network, the home near field communication server directly sends the authorized PLMN list to the UE.

Figure 4:
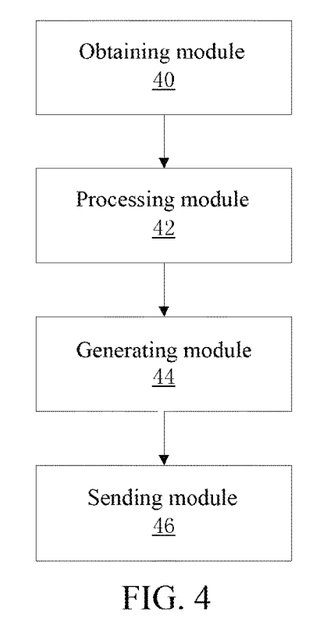
FIG. 4 is a structural block diagram of a D2D service authorization apparatus according to an embodiment of the present document.

The embodiment further provides a D2D service authorization apparatus, which is applied to the home near field communication server; as shown in FIG. 4, the apparatus includes:

an obtaining module 40, which is arranged to obtain the local PLMN list of the location in which the UE is currently located and the first PLMN list that a permission of authorization to the UE is a condition authorization;

a processing module 42, which is connected to the obtaining module 40, and is arranged to perform intersection processing on the local PLMN list and the first PLMN list to obtain the second PLMN list;

a generating module 44, which is connected to the processing module 42, and is arranged to generate the authorized PLMN list according to the PLMNs permitting the D2D authorization to the UE in the second PLMN list; and a sending module 46, which is connected to the generating module 44, and is arranged to send the authorized PLMN list to the UE.

In the embodiment, a home near field communication server is further provided, which has the above D2D service authorization apparatus.

Second, an illustration is given from a visited near field communication server side and a home near field communication server side.

Figure 5:
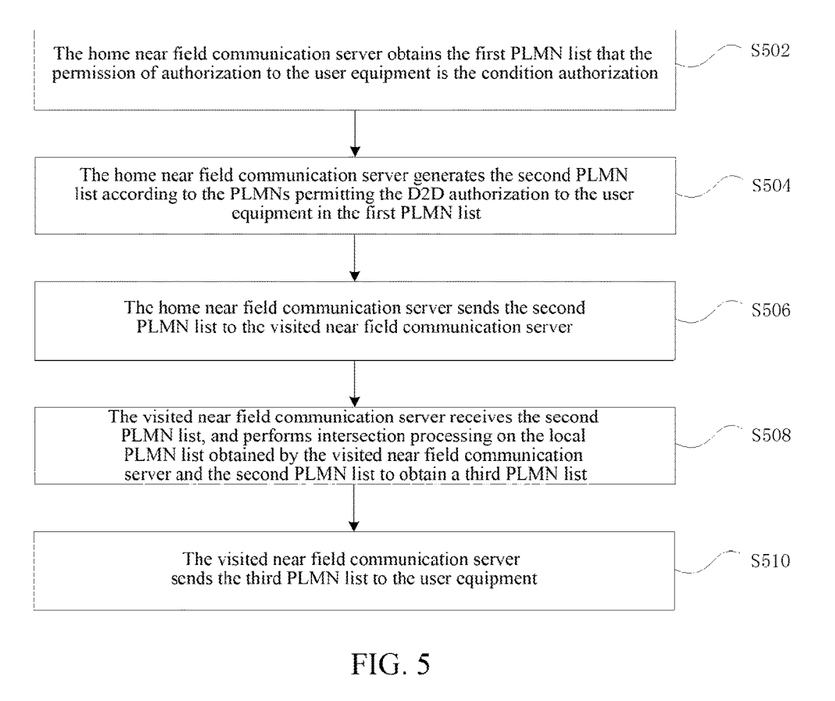
FIG. 5 is a flowchart of another D2D service authorization method according to an embodiment of the present document.

In an embodiment, another D2D service authorization method is provided. as shown in FIG. 5, the method includes the following steps:

In step S502: the home near field communication server obtains a first PLMN list that a permission of authorization to a UE is a condition authorization;

In step S504: the home near field communication server generates the second PLMN list according to PLMNs permitting a D2D authorization to the UE in the first PLMN list;

In step S506: the home near field communication server sends the second PLMN list to the visited near field communication server;

In step S508: the visited near field communication server receives the second PLMN list, and performs intersection processing on the local PLMN list obtained by the visited near field communication server and the second PLMN list to obtain the third PLMN list; and In step S510: the visited near field communication server sends the third PLMN list to the UE.

Through the above processing steps, the home near field communication server can obtain the authorized PLMN list without being configured, and the UE has no need to communicate with the local or visited near field communication server.

In the embodiment, that the home near field communication server generates the second PLMN list can be implemented by the following process: the home near field communication server determines a specified near field communication server deployed in each PLMN in the first PLMN list; the home near field communication server sends an authorization request to the specified near field communication server; and the home near field communication server receives a response message of the authorization request, herein the response message carries authorization information of the PLMN to the UE, and the authorization information is used for indicating whether authorization to the UE is permitted.

In an alternative embodiment, the local PLMN list is obtained in the following way: the visited near field communication server obtains the local PLMN list by local static configuration.

When obtaining the first PLMN list that the permission of authorization to the UE is the condition authorization, the home near field communication server obtains the fourth PLMN list permitting full authorization to the UE. At this point, the third PLMN list can be obtained in the following way:

the home near field communication server performs combination processing on the fourth PLMN list and the second PLMN list to obtain a fifth PLMN list; and the home near field communication server performs intersection processing on the fifth PLMN list and the local PLMN list to obtain the third PLMN list.

The second PLMN list can be determined in the following way: the home near field communication server determines the specified near field communication server deployed in each PLMN in the first PLMN list; the home near field communication server sends the authorization request to the specified near field communication server; and the home near field communication server receives the response message of the authorization request, herein the response message carries authorization information of the PLMN to the UE, and the authorization information is used for indicating whether authorization to the UE is permitted.

Figure 6:
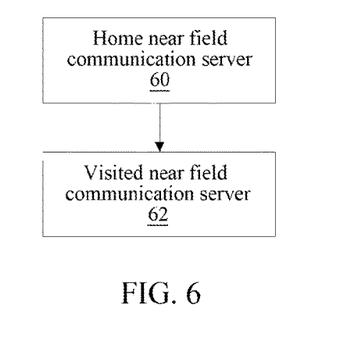
FIG. 6 is a structural block diagram of another D2D service authorization system according to an embodiment of the present document.

The embodiment further provides a D2D service authorization system. As shown in FIG. 6, the system includes: the home near field communication server 60, which is arranged to obtain the first PLMN list that the permission of authorization to the UE is the condition authorization, generate the second PLMN list according to the PLMNs permitting the D2D authorization to the UE in the first PLMN list, and send the second PLMN list to the visited near field communication server; the visited near field communication server 62, which is arranged to receive the second PLMN list, perform intersection processing on the local PLMN list obtained by the visited near field communication server and the second PLMN list to obtain the third PLMN list, and send the third PLMN list to the UE.

An embodiment of the present document further provides a D2D service authorization method, which includes the following processing steps:

In step 1: the home near field communication server determines a PLMN list needed to be further authorized;

In step 2: the home near field communication server determines a specified near field communication server address deployed in each PLMN in the PLMN list needed to be further authorized;

In step 3: the home near field communication server sends the authorization request to the specified near field communication server indicated by the specified near field communication server address;

In step 4: the home near field communication server receives the response message of the authorization request and generates the authorized PLMN list according to the response message, herein the response message carries D2D service authorization information of the PLMN to the UE, and the D2D service authorization information is used for indicating whether the PLMN permits D2D service authorization to the UE; and In step 5: the home near field communication server sends the generated and authorized PLMN list to the UE.

In step 1, the PLMN list needed to be further authorized can be determined in, but not limited to, the following way: the home near field communication server performs intersection processing on the local PLMN list and the PLMN list of the D2D authorization in user subscription information to obtain the PLMN list needed to be further authorized.

The local PLMN list can be obtained in one of the following ways: (1) the home near field communication server obtains the local PLMN list by static configuration; and (2) the home near field communication server requests the visited near field communication server of the visited network in which the UE is currently located for the local PLMN list.

The specified near field communication server includes one of the followings: the local near field wireless communication server and the visited near field wireless communication server.

An embodiment of the present document further provides another D2D service authorization apparatus, which is applied to the home near field communication server and is used for performing the D2D service authorization method. The D2D service authorization apparatus includes:

a processing module, which is arranged to determine the PLMN list needed to be further authorized, and determine the specified near field communication server address deployed in each PLMN in the PLMN list needed to be further authorized;

a first sending module, which is arranged to send the authorization request to the specified near field communication server indicated by the specified near field communication server address;

a receiving module, which is arranged to receive the response message of the authorization request, and generate the authorized PLMN list according to the response message, herein the response message carries the D2D service authorization information of the PLMN to the UE, and the D2D service authorization information is used for indicating whether the PLMN permits D2D service authorization to the UE; and a second sending module, which is arranged to send the generated authorized PLMN list to the UE.

In an alternative embodiment, the apparatus further includes: an obtaining module, which is arranged to obtain the local PLMN list of the current location in which the UE is currently located and the authorized PLMN list in the subscription information of the UE; correspondingly, the processing module is arranged to perform intersection processing on the local PLMN list and the PLMN list of the D2D service authorization in the user subscription information to obtain the PLMN list needed to be further authorized.

An embodiment of the present document further provides a home near field communication server, which includes the above D2D service authorization apparatus.

For understanding the above embodiments better, an illustration is given in detail in combination with the alternative embodiments below.

Embodiment 1

Figure 7:
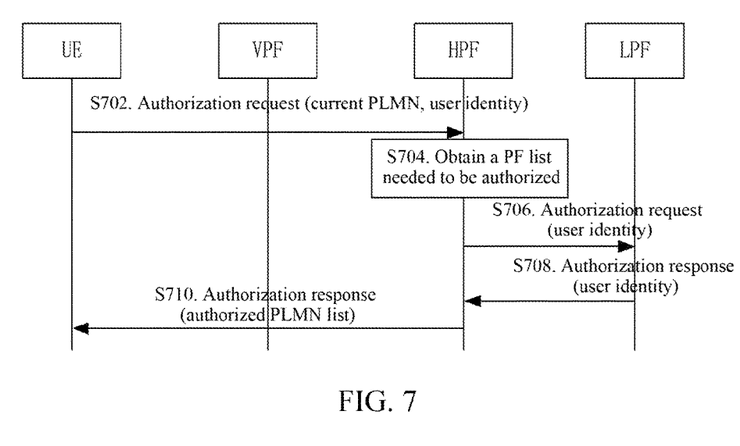
FIG. 7 is a flowchart of a D2D service authorization method according to an alternative embodiment 1 of the present document.

In the embodiment, an authorization processing method is provided; FIG. 7 shows an authorization processing method of a D2D service in a scenario where a user is in a non-roaming state. As shown in FIG. 7, the method includes the following steps.

In step S702: after accessing a home network and establishing a connection with the PDN GW of the home network, and obtaining a user IP address from the PDN GW, a terminal sends an authorization request to a home near field communication server. The terminal inquires a corresponding IP address through a DNS according to an FQDN of the home near field communication server, and then communicates with the address. The FQDN of the home near field communication server can be either statically arranged in the terminal or deduced according to a home PLMN ID. The IP address of the home near field communication server can also be arranged in the terminal. The PDN GW can also return, in the process of establishing a connection response, the IP address of the home near field communication server back to the terminal according to a user's request. The authorization request message contains information about the PLMN which the user is currently in and a user identity, for example the IMSI or the MSISDN.

In step S704: if there is no subscription information of user in the home near field communication server, the home near field communication server requests the home subscriber server for the subscription information of user; the home near field communication server stores the subscription information in the local database after obtaining it. The home near field communication server obtains the PLMN list permitting condition authorization according to the subscription information; if the home near field communication server judges that the user is in the non-roaming state according to the information about the PLMN which the user is currently in and its own PLMN, then it decides for itself the PLMN list of a local network. The home near field communication server selects the PLMNs that are overlapped in the PLMN list permitting condition authorization and the PLMN list of the local network and combines them into the PLMN list needed to be further authorized.

In step S706: after the PLMN list needed to be further authorized is obtained according to step S702, and the FQDN of the near field communication server is deduced according to the PLMN ID in the list, the IP address of the near field communication server of the PLMN is obtained by inquiring the DNS, and then an authorization request carrying the user identity is initiated to the address.

In step S708: the home near field communication server decides, according to the local configuration, whether the user is authorized to conduct the D2D service, and returns the authorization result back to a home subscriber near field communication server.

If there are multiple PLMNs in the PLMN list needed to be further authorized which is obtained in step S704, step S706 and step S708 are repeated.

In step S710: after receiving responses from the near field communication servers of all the PLMNs needed to be further authorized, the home subscriber near field communication server returns the PLMN list permitting the D2D service in the responses and the PLMN list with the full authorization in the local network, which is obtained in step S704, back to the terminal together.

After receiving the PLMN lists, the terminal can decide whether to initiate the D2D service according to the authorization result. In the above process, the UE has no need to directly communicate with the local/visited near field communication server, so the technical problem 2 in the related art is avoided; because it is a non-roaming scenario, and the home near field communication server itself knows the PLMN list of the local network, so there is no the technical problem 1.

Embodiment 2

Figure 8:
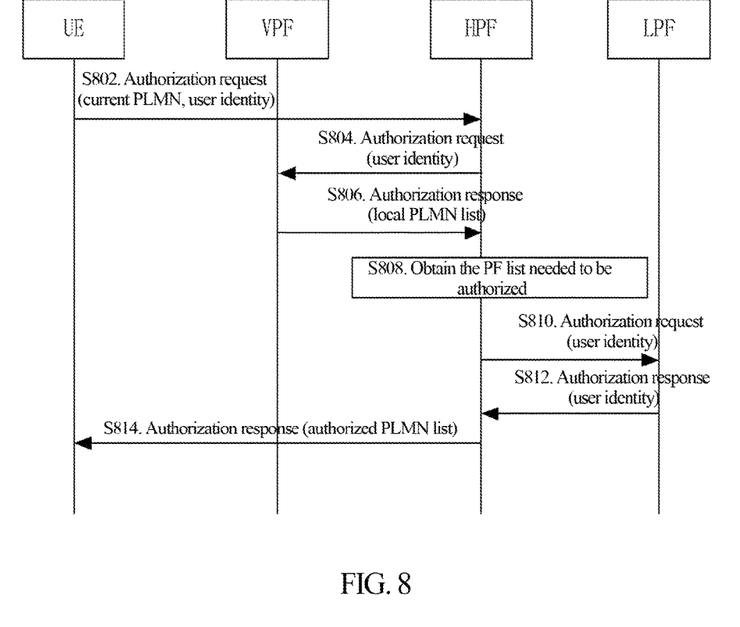
FIG. 8 is a flowchart of a D2D service authorization method according to an alternative embodiment 2 of the present document.

FIG. 8 shows a D2D service authorization method in a scenario where a user is in a roaming state and the PDN GW is in the home network. As shown in FIG. 8, the method includes the following steps.

In step S802: after a terminal accesses a visited network and establishes a connection with the PDN GW of the home network, the PDN GW notifies the UE that it is currently in the home network. The UE requests a PF address, and the terminal sends an authorization request to the home near field communication server after obtaining the user IP address. The terminal inquires the corresponding IP address through the DNS according to the FQDN of the home near field communication server, and then communicates with the address. The FQDN of the home near field communication server can be either statically arranged in the terminal or deduced according to the home PLMN ID. The IP address of the home near field communication server can also be arranged in the terminal. The PDN GW can also return, in the process of establishing the connection response, the IP address of the home near field communication server back to the terminal according to the user's request. The authorization request message contains the information about the PLMN which the user is currently in and the user identity, for example the IMSI or the MSISDN.

In step S804: if there is no subscription information of user in the home near field communication server, the home near field communication server requests the home subscriber server for the subscription information of user; the home near field communication server stores the subscription information in the local database after obtaining it, and obtains the PLMN list permitting full authorization and the PLMN list permitting condition authorization. If the home near field communication server judges that the user is in the roaming state according to the information about the PLMN which the user is currently in and its own PLMN and the PDN GW is in the home network, the home near field communication server initiates to the PLMN which the user is currently in a request of obtaining the local network, herein the request carrier the user identity. The home near field communication server deduces the corresponding FQDN according to the information about the resided PLMN, and then inquires the DNS to obtain the IP address of the near field communication server.

In step S806: the near field communication server of the network which the user is currently in returns a local network list.

In step S808: the home near field communication server obtains the PLMN lists permitting condition authorization according to the subscription information, and obtains the PLMN list of the local network from step S803; the home near field communication server selects the PLMNs that are overlapped and combines them into the PLMN list needed to be further authorized.

In step S810: after the PLMN list needed to be further authorized is obtained according to step S808, and the FQDN of the near field communication server is deduced according to the PLMN ID in the list, the IP address of the near field communication server of the PLMN is obtained by inquiring the DNS, and then the authorization request carrying the user identity is initiated to the address.

In step S812: the near field communication server decides, according to the local configuration, whether the user is authorized to conduct the D2D service, and returns the authorization result back to the home subscriber near field communication server.

If there are multiple PLMNs in the PLMN list needed to be further authorized which is obtained in step S808, step S810 and step S812 are repeated.

In step S814: after receiving responses from the near field communication servers of all the PLMNs needed to be further authorized, the home subscriber near field communication server returns the PLMN list permitting the D2D service in the responses, the PLMN list with the full authorization obtained in step S804 and in the local network obtained in step S806 back to the terminal together.

After receiving the PLMN lists, the terminal can decide whether to initiate the D2D service according to the authorization result. In the above process, the UE has no need to directly communicate with the local/visited near field communication server, so the technical problem 2 in the related art is avoided; the home near field communication server directly communicates with the near field communication server of the network which the user is in, so the technical problem 1 in the related art is avoided.

Embodiment 3

Figure 9:
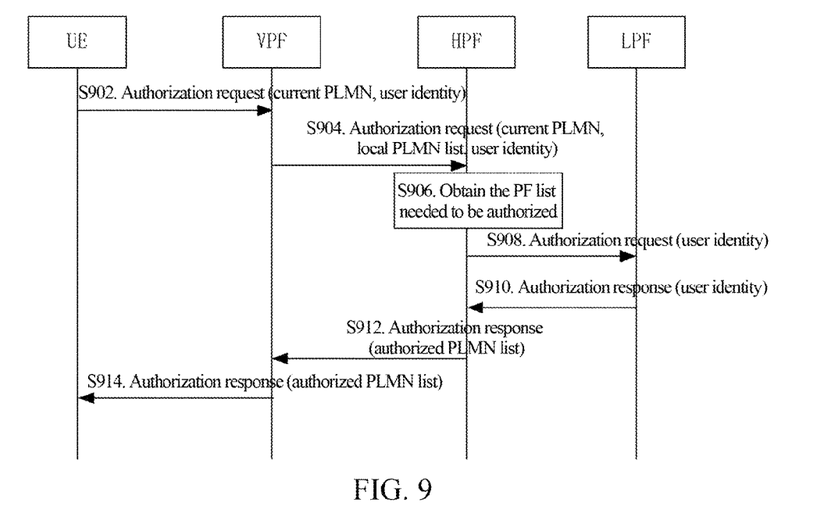
FIG. 9 is a flowchart of a D2D service authorization method according to an alternative embodiment 3 of the present document.

FIG. 9 shows a D2D service authorization method in a scenario where a user is in the roaming state and the PDN GW is in the visited network. As shown in FIG. 9, the flow includes the following steps.

In step S902: after a terminal accesses the visited network and establishes a connection with the PDN GW of the visited network, the PDN GW notifies the UE that it is currently in the visited network. The terminal sends an authorization request to the visited near field communication server after obtaining the user IP address. The terminal inquires the corresponding IP address through the DNS according to the FQDN of the visited near field communication server, and then communicates with the address. The terminal deduces the FQDN of the visited near field communication server according to the PLMN ID of the visited network. The PDN GW can also return, in the process of establishing the connection response, the IP address of the visited near field communication server back to the terminal according to the user's request. The authorization request message contains the information about the PLMN which the user is currently in and the user identity, for example the IMSI or the MSISDN.

In step S904: If the visited near field communication server judges that the user is in the roaming state according to the user identity, the visited near field communication server deduces the FQDN of the home subscriber near field communication server according to the user identity, inquires the DNS to obtain the IP address of the home near field communication server, and sends an authorization request to the address, herein the message carries the information about the PLMN which the user is currently in, the user identity and the local network list.

In step S906: if there is no subscription information of user in the home near field communication server, the home near field communication server requests the home subscriber server for the subscription information of user; the home near field communication server stores the subscription information in the local database after obtaining it. The home near field communication server obtains the PLMN list permitting full authorization and the PLMN list permitting condition authorization according to the subscription information, then selects the PLMNs which are in both the PLMN list permitting the condition authorization and the local network list obtained in step S904, and combines them into the PLMN list needed to be further authorized.

In step S908: after the PLMN list needed to be further authorized is obtained according to step S906, and the FQDN of the corresponding near field communication server is deduced according to the PLMN ID in the list, the IP address of the near field communication server of the PLMN is obtained by inquiring the DNS, and then an authorization request carrying the user identity is initiated to the address.

In step S910: the near field communication server decides, according to the local configuration, whether the user is authorized to conduct the D2D service, and returns the authorization result back to the home subscriber near field communication server.

If there are multiple PLMNs in the PLMN list needed to be further authorized which is obtained in step S906, step S908 and step S910 are repeated.

In step S912: after receiving responses from the near field communication servers of all the PLMNs needed to be further authorized, the home subscriber near field communication server returns the PLMN list permitting the D2D service in the responses and the PLMN list permitting the full authorization obtained in step S906 and in the local network obtained in step S904 back to the visited near field communication server together.

In step S914: the visited near field communication server forwards the received authorized PLMN list to the terminal.

After receiving the PLMN lists, the terminal can decide whether to initiate the D2D service according to the authorization result. In the above process, the UE has no need to directly communicate with the local/visited near field communication server, so the technical problem 2 in the related art is avoided; the near field communication server of the network which the user is in directly sends the local network list to the home near field communication server, so the technical problem 1 in the related art is avoided.

Embodiment 4

Figure 10:
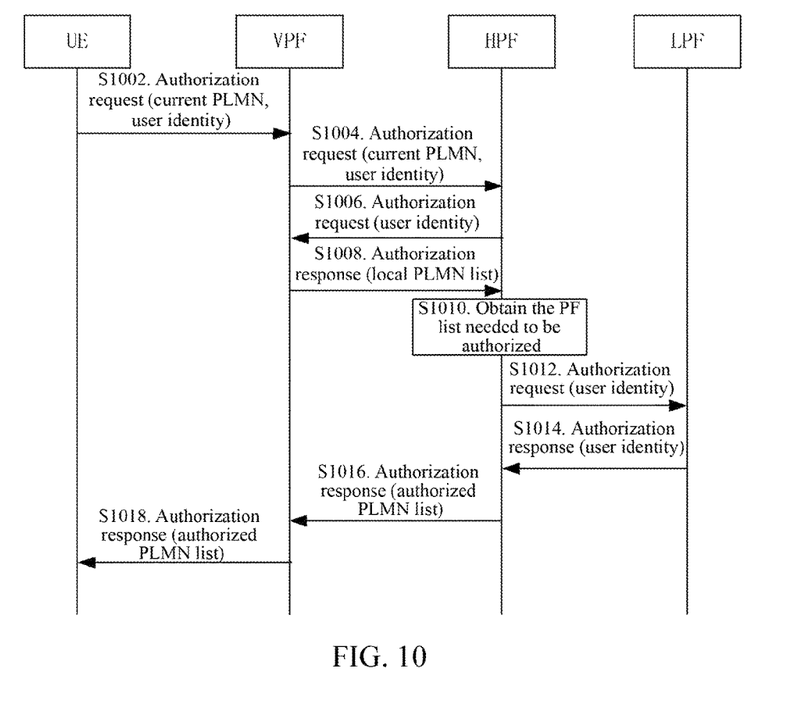
FIG. 10 is a flowchart of a D2D service authorization method according to an alternative embodiment 4 of the present document.

FIG. 10 shows a flowchart 2 of an authorization processing method according to an embodiment of the present document in a scenario where a user is in the roaming state and the PDN GW is in the visited network. As shown in FIG. 10, the flow includes the following steps.

In step S1002: after a terminal accesses the visited network and establishes a connection with the PDN GW of the visited network, the PDN GW notifies the UE that it is currently in the visited network. After obtaining the user IP address, the terminal sends an authorization request to the visited near field communication server. The terminal inquires the corresponding IP address through the DNS according to the FQDN of the visited near field communication server, and then communicates with the address. The terminal deduces the FQDN of the visited near field communication server according to the PLMN ID of the visited network. The PDN GW can also return, in the process of establishing the connection response, the IP address of the home near field communication server back to the terminal according to the user's request. The authorization request message contains the information about the PLMN which the user is currently in and the user identity, for example the IMSI or the MSISDN.

In step S1004: If the visited near field communication server judges that the user is in the roaming state according to the user identity, the visited near field communication server deduces the FQDN of the home subscriber near field communication server according to the user identity, inquires the DNS to obtain the IP address of the home near field communication server, and sends an authorization request to the address, herein the message carries the information about the PLMN which the user is currently in and the user identity.

In step S1006: if there is no subscription information of user in the home near field communication server, the home near field communication server requests the home subscriber server for the subscription information of user; the home near field communication server stores the subscription information in the local database after obtaining it. The home near field communication server obtains the PLMN list permitting full authorization and the PLMN list permitting condition authorization according to the subscription information. The home near field communication server initiates the request of obtaining the local network to the PLMN which the user is currently in, herein the request carries the user identity. The home near field communication server deduces the corresponding FQDN according to the information about the resided PLMN, and then inquires the DNS to obtain the IP address of the near field communication server.

In step S1008: the near field communication server of the network which the user is currently in returns the local network list.

In step S1010: the home near field communication server obtains the PLMN lists permitting condition authorization according to the subscription information, and obtains the PLMN list of the local network from S1004; the home near field communication server selects the PLMNs that are overlapped and combines them into the PLMN list needed to be further authorized.

In step S1012: according to the PLMN list needed to be further authorized obtained in step S1005, and according to the PLMN ID in the list, the FQDN of the corresponding near field communication server is deduced, the IP address of the near field communication server of the PLMN is obtained by inquiring the DNS, and then the authorization request carrying the user identity is initiated to the address.

In step S1014: the near field communication server decides, according to the local configuration, whether the user is authorized to conduct the D2D service, and returns the authorization result back to the home subscriber near field communication server.

If there are multiple PLMNs in the PLMN list needed to be further authorized which is obtained in step S1010, step S1012 and step S1014 are repeated.

In step S1016: after receiving responses from the near field communication servers of all the PLMNs needed to be further authorized, the home subscriber near field communication server returns the PLMN list permitting the D2D service in the responses and the PLMN list permitting the full authorization obtained in step S1006 and in the local network obtained in step S1008 back to the visited near field communication server together.

In step S1018: the visited near field communication server forwards the received authorized PLMN list to the terminal.

After receiving the PLMN lists, the terminal can decide whether to initiate the D2D service according to the authorization result. In the above process, the UE has no need to directly communicate with the local/visited near field communication server, so the technical problem 2 in the related art is avoided; the home near field communication server obtains the local network list from the near field communication server of the network which the user is in, so the technical problem 1 in the related art is avoided.

Embodiment 5

Figure 11:
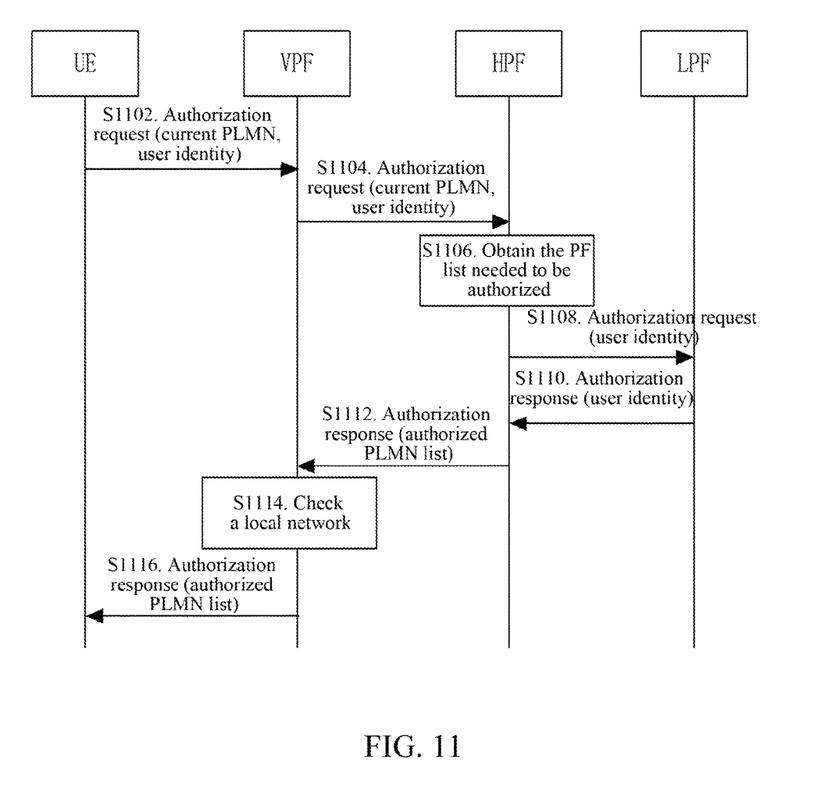
FIG. 11 is a flowchart of a D2D service authorization method according to an alternative embodiment 5 of the present document.

FIG. 11 shows a flowchart 3 of an authorization processing method according to an embodiment of the present document in a scenario where a user is in the roaming state and the PDN GW is in the visited network. As shown in FIG. 11, the flow includes the following steps.

In step S1102: after a terminal accesses the visited network and establishes a connection with the PDN GW of the visited network, the PDN GW notifies the UE that it is currently in the visited network. After obtaining the user IP address, the terminal sends an authorization request to the visited near field communication server. The terminal inquires the corresponding IP address through the DNS according to the FQDN of the visited near field communication server, and then communicates with the address. The terminal deduces the FQDN of the visited near field communication server according to the PLMN ID of the visited network. The PDN GW can also return, in the process of establishing the connection response, the IP address of the home near field communication server back to the terminal according to the user's request. The authorization request message contains the information about the PLMN which the user is currently in and the user identity, for example the IMSI or the MSISDN.

In step S1104: If the visited near field communication server judges that the user is in the roaming state according to the user identity, the visited near field communication server deduces the FQDN of the home subscriber near field communication server according to the user identity, inquires the DNS to obtain the IP address of the home near field communication server, and sends an authorization request to the address, herein the message carries the information about the PLMN which the user is currently in and the user identity.

In step S1106: if there is no subscription information of user in the home near field communication server, the home near field communication server requests the home subscriber server for the subscription information of user; the home near field communication server stores the subscription information in the local database after obtaining it. The home near field communication server obtains the PLMN list permitting full authorization and the PLMN list permitting condition authorization according to the subscription information.

In step S1108: according to the PLMN list permitting condition authorization obtained in step S1103, and according to the PLMN ID in the list, the FQDN of the corresponding near field communication server is deduced, the IP address of the near field communication server of the PLMN is obtained by inquiring the DNS, and then the authorization request carrying the user identity is initiated to the address.

In step S1110: the near field communication server decides, according to the local configuration, whether the user is authorized to conduct the D2D service, and returns the authorization result back to the home subscriber near field communication server.

If there are multiple PLMNs in the PLMN list permitting condition authorization which is obtained in step S1106, step S1108 and step S1110 are repeated.

In step S1112: after receiving responses from the near field communication servers of all the PLMNs needed to be further authorized, the home subscriber near field communication server combines the PLMN list permitting the D2D service in the responses and the PLMN list permitting full authorization which obtained in step S1106 into the authorized PLMN list and returns the authorized PLMN list back to the visited near field communication server.

In step S1114: the visited near field communication server deletes the PLMN which is not in the local network list from the received authorized PLMN list according to the local network list configured locally.

In step S1116: the visited near field communication server forwards the authorized PLMN list after the processing of step S1114 to the terminal.

After receiving the PLMN lists, the terminal can decide whether to initiate the D2D service according to the authorization result. In the above process, the UE has no need to directly communicate with the local/visited near field communication server, so the technical problem 2 in the related art is avoided; the home near field communication server obtains the local network list from the near field communication server of the network which the user is in, so the technical problem 1 in the related art is avoided.

In another embodiment, a piece of software is further provided, which is used for performing the technical solutions described in the above embodiments and alternative embodiments.

In another embodiment, a storage medium is further provided, in which the above software is stored; the storage medium includes, but is not limited to: a compact disk, a floppy disk, a hard disk and an erasable memory.

Obviously, those skilled in the art should appreciate that the above modules and steps of the present document can be implemented by a general-purpose computing device, and they can be centralized in a single computing device or distributed on a network composed of multiple computing devices; optionally, they can be implemented by a program code which is capable of being executed by the computing device, so that they can be stored in a storage device and executed by the computing device; and in some situations, the presented or described steps can be executed in an order different from that described here; or they are made into integrated circuit modules, respectively; or multiple modules and steps of them are made into a single integrated circuit module to realize. In this way, the present document is not limited to any particular combination of hardware and software.

The above is only the alternative embodiment of the present document and not intended to limit the present document; for those skilled in the art, the present document may have various modifications and changes. Any modifications, equivalent replacements, improvements and the like within the spirit and principle of the present document shall fall within the scope of protection of the present document.

What is claimed is:

1. A Device to Device (D2D) service authorization method, comprising:

determining, by a home near field communication server, a Public Land Mobile Network (PLMN) list needed to be further authorized;

determining, by the home near field communication server, a specified near field communication server address deployed in each PLMN in the PLMN list needed to be further authorized;

sending, by the home near field communication server, an authorization request to a specified near field communication server indicated by the specified near field communication server address;

receiving, by the home near field communication server, a response message of the authorization request, and generating an authorized PLMN list according to the response message, wherein the response message carries D2D service authorization information of the PLMN to a user equipment, and the D2D service authorization information is used for indicating whether the PLMN permits D2D service authorization to the user equipment; and sending, by the home near field communication server, the generated and authorized PLMN list to the user equipment.

2. The method according to claim 1, wherein, determining, by the home near field communication server, the PLMN list needed to be further authorized comprises:

performing, by the home near field communication server, intersection processing on a local PLMN list and a PLMN list of the D2D authorization in user subscription information to obtain the PLMN list needed to be further authorized.

3. The method according to claim 2, wherein, the local PLMN list is obtained in one of the following ways:

obtaining, by the home near field communication server, the local PLMN list by static configuration; and requesting, by the home near field communication server, a visited near field communication server of a visited network in which the user equipment is currently located for the local PLMN list.

4. A Device to Device (D2D) service authorization apparatus, which is applied to a home near field communication server, comprising:

a processing module, arranged to determine a Public Land Mobile Network (PLMN) list needed to be further authorized, and determine a specified near field communication server address deployed in each PLMN in the PLMN list needed to be further authorized;

a first sending module, arranged to send an authorization request to a specified near field communication server indicated by the specified near field communication server address;

a receiving module, arranged to receive a response message of the authorization request, and generate an authorized PLMN list according to the response message, wherein the response message carries D2D service authorization information of the PLMN to a user equipment, and the D2D service authorization information is used for indicating whether the PLMN permits D2D service authorization to the user equipment; and a second sending module, arranged to send the generated and authorized PLMN list to the user equipment.

5. The apparatus according to claim 4, further comprising:

an obtaining module, arranged to obtain a local PLMN list of a location in which the user equipment is currently located and the authorized PLMN list in subscription information of the user equipment; and the processing module, arranged to perform intersection processing on the local PLMN list and a PLMN list of the D2D service authorization in the user subscription information to obtain the PLMN list needed to be further authorized.

6. A home near field communication server, comprising: a Device to Device (D2D) service authorization apparatus according to claim 4.

* * * * *